United States Statutory Invention Registration [19]

[11] Reg. Number: H902

Rousseau

[43] Published: Apr. 2, 1991

[54] AIR COOLED HELMET

[75] Inventor: David G. Rousseau, San Diego, Calif.

[73] Assignee: The United States of America as represented by the Secretary of the Navy, Washington, D.C.

[21] Appl. No.: 302,524

[22] Filed: Jan. 27, 1989

[51] Int. Cl.[5] ..... A42B 3/02

[52] U.S. Cl. ..... 2/414; 2/6

[58] Field of Search ..... 2/6, 411, 414

[56] References Cited

U.S. PATENT DOCUMENTS

| | | | |
|---|---|---|---|
| 3,223,086 | 6/1965 | Denton | 128/142 |
| 3,566,409 | 3/1971 | Hopper | 2/414 |
| 4,054,953 | 10/1977 | De Barsy | 2/414 |
| 4,095,289 | 6/1978 | Kissen et al. | 2/6 |
| 4,100,320 | 7/1978 | Chisum | 2/64 R |
| 4,227,520 | 10/1980 | Lord | 2/6 X |
| 4,549,541 | 10/1985 | Sundahl | 2/6 X |

FOREIGN PATENT DOCUMENTS

| | | | |
|---|---|---|---|
| 3220691 | 12/1983 | Fed. Rep. of Germany | 2/411 |

*Primary Examiner*—Thomas H. Tarcza

*Assistant Examiner*—Linda J. Wallace

*Attorney, Agent, or Firm*—Luther A. Marsh; John H. Stowe

[57] ABSTRACT

A protective helmet adapted for distributing cooled air to the head of a person comprising an outer shell and an inner lining of open cell foam. A cool air inlet conducts cooled air into the capillary system of the open cell foam where it is distributed throughout the volume of the foam. The cool air exits a multiplicity of pores in the surface of the foam in a randomly oriented fashion, providing cooled air substantially evenly distributed over the head.

5 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AIR COOLED HELMET

FIELD OF THE INVENTION

This invention relates to the field of protective helmets and more particularly to helmets adapted for overall cooling of the head while retaining shock absorbing capability.

BACKGROUND OF THE INVENTION

Heat stress which results from work in areas of elevated temperature can be devastating especially where the work is done in confined spaces such as the crew spaces of an aircraft. In the aircraft situation, heat generating electronics within a modern aircraft generate an inordinate amount of heat in the closed area. This heat, especially when combined with solar radiation captured through the aircraft canopy, can cause the heat inside the closed area to rise to high levels. In the aircraft situation, the heat rise is aggravated when there are delays in the flight schedule. In flight, the cockpit area is cooled by the external environment and by an otherwise sufficient cooling system. One of the most susceptible parts of the pilot's anatomy to heat stress is his head, and this situation is made worse by capture and retention of heat radiated from the pilots head when the pilot is wearing a protective helmet. It is well known that a substantial part of the body's radiated heat is radiated from the scalp. In some aircraft, even on a moderate day, the temperature on the outside of a pilot's helmet may reach a temperature of 54.4° C. (130° F.) and the pilot's scalp temperature may reach a temperature of 43.3° C. (110° F.). Similar situations exist in other closed or heat producing areas in both military and industrial environments.

Introduction of air into a helmet for various purposes is well known in the prior art. In U.S. Pat. No. 4,095,289 to Kissen, et al., air is introduced into a pilot's helmet to provide air flow between the face of the user and the helmet visor. Cooled air for the pilot's head, provided through a plurality of discrete tubes with exit orifices in the tubes directed to discrete points on the pilots head, is shown in U.S. Pat. No. 4,100,320 to Chisum. An air cooled helmet of the plenum and controlled escape orifice is shown in U.S. Pat. No. 3,223,086.

SUMMARY OF THE INVENTION

According to this invention, cooled air is introduced into the helmet and uniformly distributed throughout the to the user's head, especially the area of the scalp by a randomly oriented capillary network such as that in an open cell foam and flows onto the pilot's head through randomly directed pores in the surface such as the pores in the surface of the foam.

According to the invention, an impact protecting helmet for applying cooled air to the head of a person, an open cell foam liner is affixedly attached to the inside of a helmet, one surface of the foam being juxtaposed with the head when the head is in the normal wearing position. The foam liner has an internal capillary system exiting through a multiplicity of pores along the surface juxtaposed the head. Cool air is conveyed into the internal capillary system of the foam through at least one cool air inlet duct affixedly attached to the outer shell.

It is an object of this invention to provide a helmet having evenly distributed cooling air over the scalp of the wearer.

It is a further object of this invention to provide a helmet having evenly distributed air flow while maintaining the shock absorbing capability of the helmet.

The above and other objects, features and advantages of the present invention will become apparent from a consideration of the following detailed description presented in connection with the accompanying drawings in which:

DESCRIPTION OF THE DRAWINGS

In the drawings, to which reference will be made in the specification, similar reference characters have been employed to designate corresponding parts throughout the several views.

DETAILED DESCRIPTION OF THE INVENTION

Figure 1:
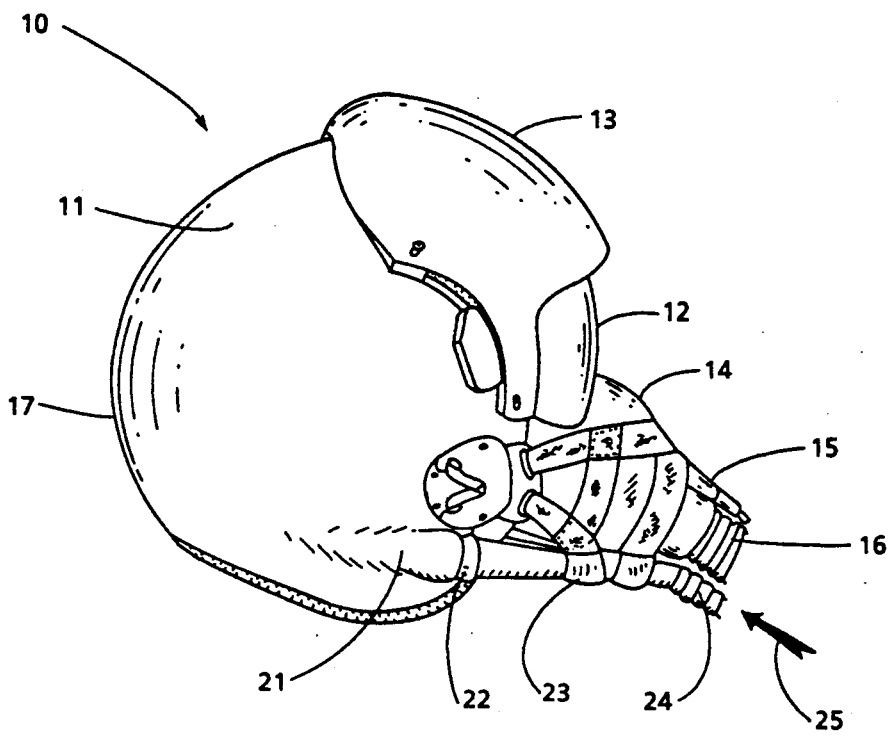
FIG. 1 is a side elevation view showing the preferred embodiment of the overall construction of the helmet.

Referring now to FIG. 1, the preferred embodiment of the present invention is illustrated generally as helmet 10. Except as otherwise described herein, helmet 10 is of conventional construction having an outer shell 11 with visor 12; visor guard 13; breathing apparatus 14; communications hook-up 15; and, breathing supply hose 16.

Figure 2:
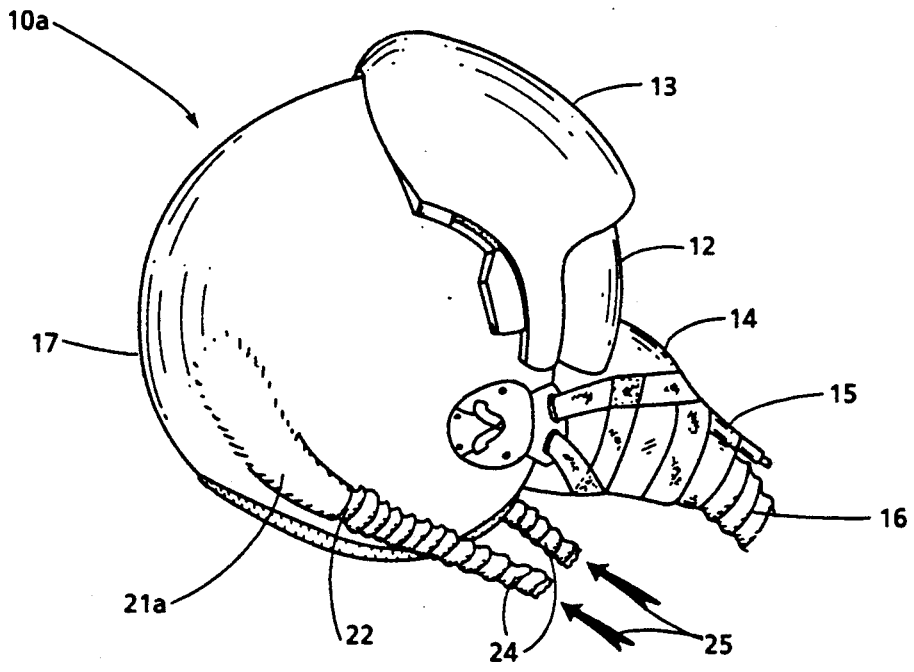
FIG. 2 is a side elevation view showing an alternate embodiment of the overall construction of the helmet.

Turning now to the present invention and again to FIG. 1, outer shell 11 is adapted to receive cool air inlet ducts 21 along lines generally parallel with hose 16 of breathing apparatus 14 and in a manner such that air entering helmet 10 is substantially tangent to the interior of the helmet. Air inlet ducts 21 receive cool air quick disconnect plugs 22 which are at terminus ends of cool air inlet hoses 24. Cool air is conveyed in the interior of hoses 24 in the direction indicated by arrow 25. Cool air quick disconnect plugs 22 are retained near breathing apparatus 14 to ensure common movement of breathing apparatus 14, hose 16 and communications hook-up 15 with cool air inlet hoses 24. Although one of each of duct 21, disconnect 22, strap 23, and inlet hose 24 is shown, the arrangement shown in FIG. 1 is duplicated symmetrically opposite from that shown. Alternately, as shown in FIG. 2, cool air inlet ducts **21*a* may be located near the rear 17 of helmet 10*a*. Cool air quick disconnects 22 and hoses 24 are connected to cool air inlet duct 21*a* with air flow in the direction of arrows 25. Again, one cool air inlet duct 21*a* is shown with a second inlet duct 21*a*** being symmetrically opposite the one shown.

Figure 3:
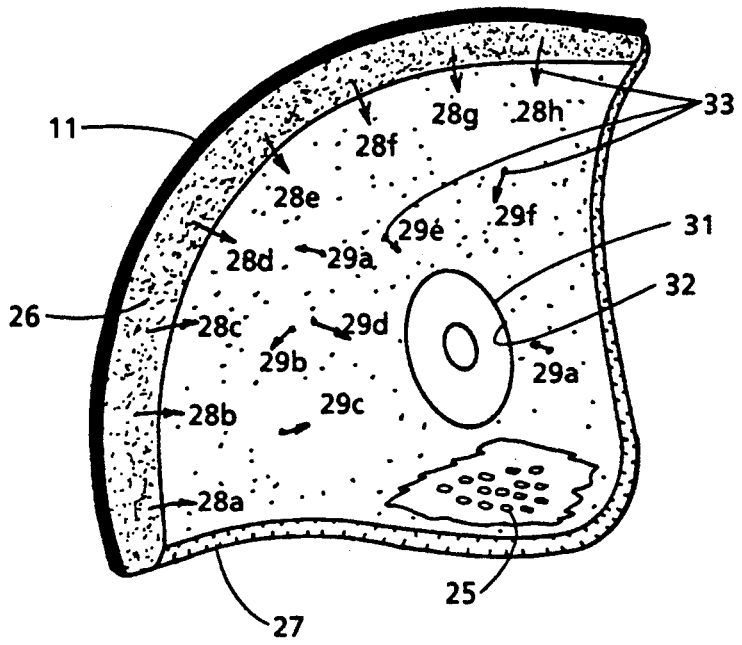
FIG. 3 is a section view taken along the axis of symmetry of the helmet, shown without hoses and visors, illustrating the preferred embodiment of the internal construction of the helmet.

Referring now to FIG. 3, open cell foam liner 26 is adhesively bonded around the peripheral interior of outer shell 11 of helmet 10. Cool air entering through cool air inlet ducts 21 is further conveyed through outer shell 11 by convenient means such as for example orifices 25. Orifices 25 may be a series of holes through outer shell 11 at an acute angle to the local tangent of the surface of shell 11 to improve the flow in the direction along the inner periphery of shell 11. Once inside shell 11, cool air flows through the capillary system that exists in open cell foam liner 26. Open cell foam liner 26 substantially covers the inner periphery of outer shell 11 and is substantially free to communicate cool air throughout the areas of coverage. Sealed edge 27 prevents the unwanted flow of cool air out of helmet 10 in a direction away from the scalp of the wearer and sealed edge 32 around embedded earphone assembly 31 prevents flow of cool air into the area around the wearer's ears, interfering with hearing due to pneumatic noise. Air flows from open cell foam liner 26 through a multiplicity of pores 33 in a multiplicity of directions indicated by arrows 28*a*–28*h* and 29*a*–29*g*. The various directions of arrows 29*a*–29*g* are illustrative of the random nature of flow directions from the foam. The randomly directed flow and multiplicity of pores serves to reduce cold spots and to improve the distribution and effectiveness of the cooling.

Figure 4:
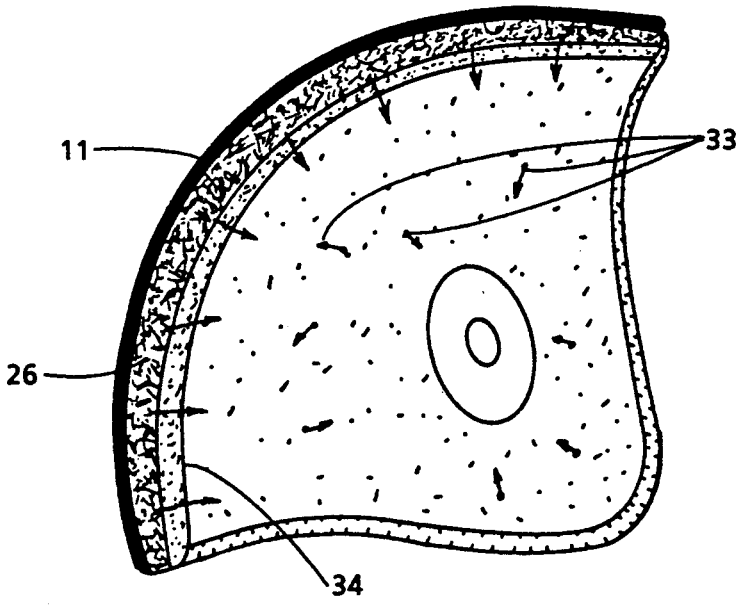
FIG. 4 is similar to FIG. 3 except showing an alternate embodiment of the helmet.

Referring now to FIG. 4, an alternate embodiment of internal construction of either helmet 10 or 10*a* is generally shown. Open cell foam liner 26 is affixedly attached to the internal shell 11 by conventional means such as by adhesive bonding. Auxiliary lining 34 is in turn affixedly attached to open cell foam liner 26 by conventional means such as adhesive bonding. Auxiliary lining 34 is selected from conventional materials having impact absorbing characteristics. Depending on the density and distribution of the internal capillary system of auxiliary lining 34, it may be necessary to provide a manufactured system of pores 33*a* through auxiliary lining 34. Manufactured pores 34 are preferably at random angles with respect to the local tangent of the inner periphery of the auxiliary lining. A system of manufactured pores 33*a* at randomly selected angles will have effects similar to and approximating the effects of random flow from the open cell foam when used without auxiliary lining 34.

Many obvious modifications in the details and arrangement of parts may be made, however, without departing from the true spirit and scope of the invention, as more particularly defined in the appended claims.

What is claimed is:

1. A protective helmet for applying cooled air to the head of a person, comprising:

an outer shell;

an open cell foam liner, said foam liner having an edge and first and second principal surfaces, said first principal surface affixedly attached to the internal periphery of said outer shell and said second principal surface juxtaposed the normal position of the head of said person when wearing said helmet, said foam liner further having an internal capillary system, said capillary system in fluid communication with a multiplicity of pores opening along said second principal surface; and, at least one cool air inlet duct affixedly attached to said outer shell, said cool air inlet duct in fluid communication with the internal capillary system of said open cell foam liner.

2. A protective helmet for applying cooled air to the head of a person as claimed in claim 1 further comprising an auxiliary liner having pores in fluid communication with the pores of said open cell foam liner, said auxiliary liner interposed between said second principal surface of said open cell foam liner and the normal position of the head of said person when wearing said helmet.

3. A protective helmet for applying cooled air to the head of a person as claimed in claim 2 wherein said pores in said liner are manufactured pores.

4. A protective helmet for applying cooled air to the head of a person as claimed in claim 1 wherein a portion of the edge of said open cell foam liner is sealed to prevent fluid communication through said portion of said edge.

5. A protective helmet for applying cooled air to the head of a person as claimed in claim 1 wherein said cool air inlet duct fluidly communicates with the internal capillary system through at least one orifice in said outer shell, said orifice at an effective angle with the local tangent of the exterior of said shell.

* * * * *